United States Patent [19]

Maguire

[11] 4,126,374
[45] Nov. 21, 1978

[54] BINOCULAR ASSEMBLY WITH IMPROVED FOCUSING MECHANISM

[76] Inventor: Paul R. Maguire, 4284 Sea View La., Los Angeles, Calif. 90065

[21] Appl. No.: 745,619

[22] Filed: Nov. 29, 1976

[51] Int. Cl.² .............................................. G02B 7/04
[52] U.S. Cl. ......................................... 350/47; 350/77
[58] Field of Search ....................... 350/41, 42, 44, 46, 350/47, 74, 75, 76, 77

[56] References Cited

U.S. PATENT DOCUMENTS

| 535,862 | 3/1895 | Sawyer | 350/77 |
| 647,136 | 4/1900 | Glocker | 350/77 |
| 802,817 | 10/1905 | Lloyd | 350/76 |

FOREIGN PATENT DOCUMENTS

| 88,879 | 7/1895 | Fed. Rep. of Germany | 350/76 |
| 269,445 | 1/1914 | Fed. Rep. of Germany | 350/76 |
| 966,345 | 8/1957 | Fed. Rep. of Germany | 350/76 |
| 1,218,280 | 6/1966 | Fed. Rep. of Germany | 350/46 |

Primary Examiner—John K. Corbin
Assistant Examiner—Matthew W. Koren
Attorney, Agent, or Firm—Harold L. Jackson; Stanley R. Jones; Joseph W. Price

[57] ABSTRACT

An optical assembly, such as binoculars, having an objective and ocular lens system is focused by the axial displacement of at least one lens system on the optical axis. A manually operated actuator is translationally displaced on the binocular housing to impart the focusing movement. Preferably the actuator is a segment of flexible belt connected to a forked cam arrangement for actually displacing a focusing lens. The binocular housing along with the cam focusing lens system can be both aligned and retained in an operative mode by an elongated shaft extending through the segments of the binocular housing. The binocular housing is split and rotatable about the shaft within the range of movement of the flexible belt.

20 Claims, 3 Drawing Figures

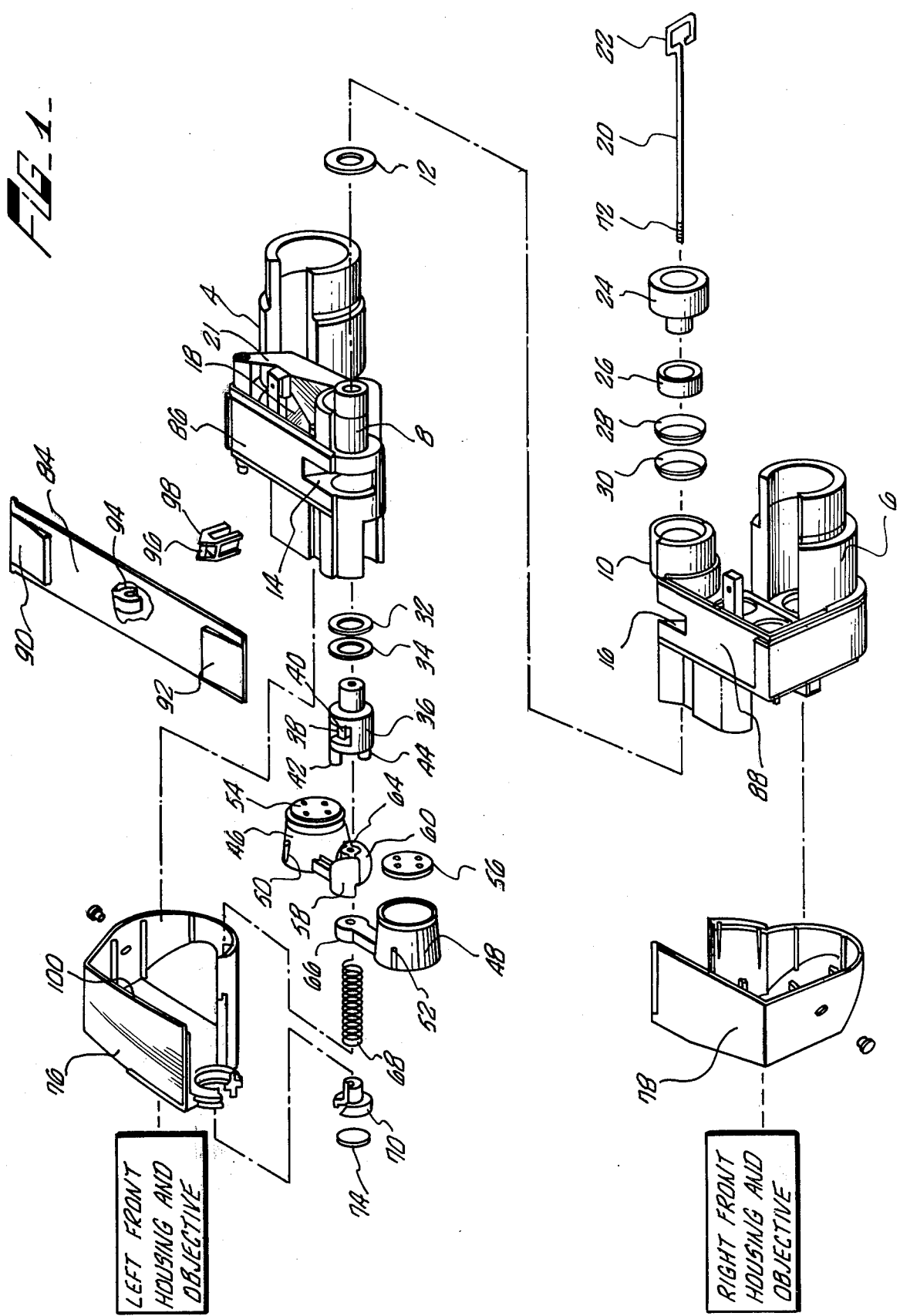

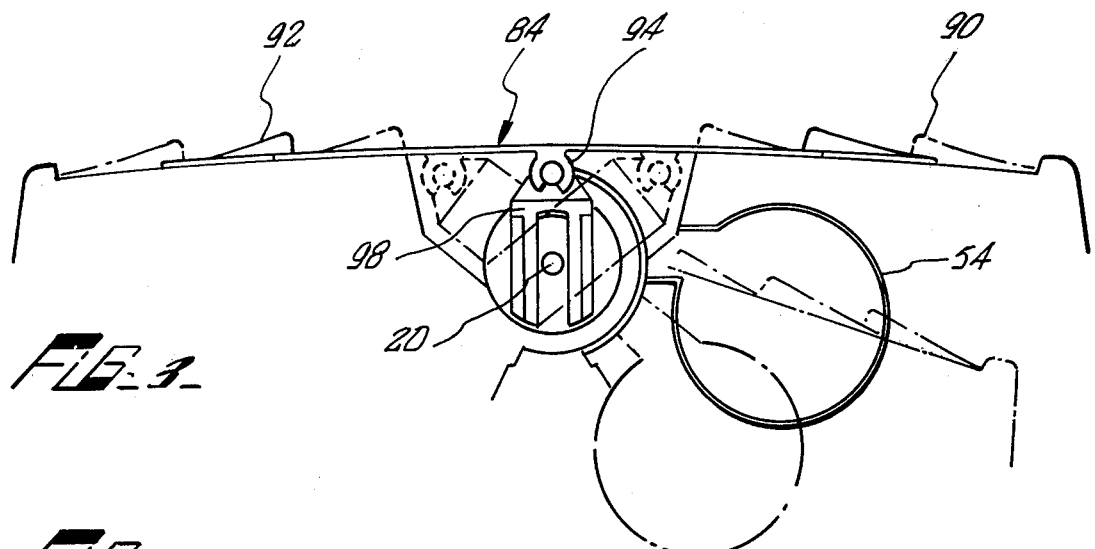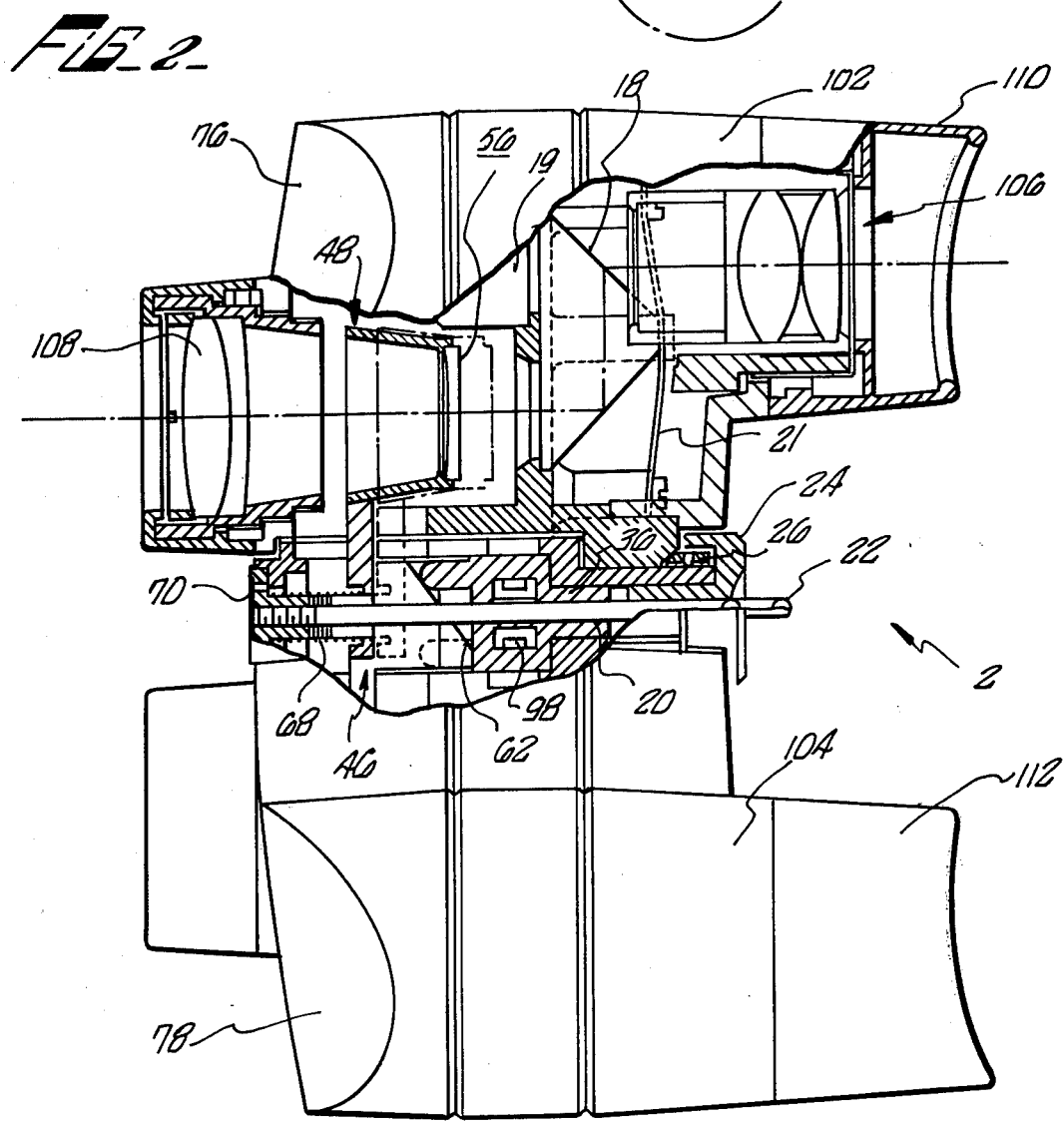

BINOCULAR ASSEMBLY WITH IMPROVED FOCUSING MECHANISM

BACKGROUND OF THE INVENTION

1. Field of the Invention

The present invention is directed to an optical assembly and more particularly to an improved focusing mechanism and method of assembly for binoculars.

2. Description of the Prior Art

As with most commercial optical systems a number of subtle design considerations are involved in providing a cost competitive and esthetically pleasing product for the consumer.

Any spectator at a sports event or observer viewing an activity at a substantial distance will generally resort to binoculars. In this regard, a binocular design must take into consideration the physiological effects on the user plus the esthetic appearance and functionability of the binoculars. If the binocular is not in good balance it can become tiring on the User. For example, if the binocular assembly extends too far from the head of the observer, the cantilevered extension will magnify any vibrations that are introduced. Conversely, if the binocular mechanism is too heavy, then it will introduce fatigue and cause muscle spasms preventing an extended use period. It is also important not to design the binocular mechanism to be too light because this in itself will permit the human anatomy to cause or at least introduce vibrations in the system and will also render the equipment prone to physical damage. Finally, since the binoculars are frequently utilized in spectator sports, a highly esthetic appearance is appealing to the user and accordingly enhances its saleability.

Generally binoculars will include a standard objective lens system, at least one or more prisms for folding the optical axis, a focusing lens and finally an ocular lens. This optical system is provided for each eye. Generally the focusing lens in both the left and right optical system will be moved in unison by the rotation of a knarled knob which interacts with a threaded shaft carrying the respective focusing lenses. While the knob provides adequate focusing, it also adds bulk to the binocular housing and does not adapt itself to a split housing with relative movement.

It is still a goal of the prior art to provide a lightweight compact easily manufactured binocular mechanism that is highly attractive in its appearance and functionable for the consumer.

SUMMARY OF THE INVENTION

The present invention provides an optical system adaptable for manual focusing in a compact easily manufactured housing construction. An actuator is mounted on the exterior of the housing to provide a limited translational displacement relative to the housing. Preferably the optical system is a binocular mechanism wherein a substantially linear displacement is translated to an axial displacement of the focusing assembly on the optical axis. The actuator can be a segment of a flexible belt that is captured across the top of the right and left housing components of the binocular mechanism. The right and left housing components are relatively movable about a center axis of rotation within the flexibility range of movement of the belt.

Advantageously, the axis of rotation is provided by an elongated shaft member that extends parallel to the line of sight to provide a highly efficient and convenient fastening mechanism to hold the segments of the binocular housing together.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is an exploded partial perspective view of the binocular assembly of the present invention;

FIG. 2 is a back partial cross-sectional view of the present invention; and

FIG. 3 is a schematic cross-sectional view disclosing the operation of the present invention.

DESCRIPTION OF THE PREFERRED EMBODIMENT

The following specification taken in conjunction with the drawings, sets forth the preferred embodiment of the present invention in such a manner that any person skilled in the optical arts can utilize the invention. The embodiment of the invention disclosed herein, is the best mode contemplated by the inventor in carrying out his invention in a commercial environment, although it should be understood that various modifications can be accomplished in the parameters of this invention.

Referring to FIG. 1, a perspective exploded view of the principal component parts of the present invention are disclosed. As can be quickly appreciated, standard components of the binocular mechanism such as the ocular and the objective lenses and each of the ocular prism covers are not disclosed in order to permit a more concise graphic definition of the present invention. A person skilled in the optical arts is well aware of the design parameters of both the ocular and objective lenses for binocular systems.

In general, the binocular mechanism will include identical right and left optical systems of a conventional design. Generally, this will comprise a front objective lens assembly, a series of prisms or reflecting mirrors to fold the optical axis, a focusing lens assembly and finally an eye piece or ocular lens assembly. The assembled binocular housing components include relatively movable prism shelves with oversize ocular and objective cover members. The oversize design permits subjective styling changes for secondary product lines and further provides ample shock protection for the mounted prisms and lenses.

In FIG. 1, the binocular assembly 2 is disclosed in an exploded view with the parts interconnected with trace lines showing the relative sequence of construction. The respective prism covers and ocular and objective lens systems are connected to relatively movable internal base housing members or prism shelves 4 and 6 respectively. The prism shelf member 4 has a tubular connector 8 which is adapted to be mounted within a female connector ring 10 on the other prism shelf member 6. A spacer washer 12 can be first inserted within the female connector ring 10. The respective interfacing components of the prism shelf members 4 and 6, are designed to permit a relative rotational movement. The purpose for this rotation is to permit a subjective adjustment of the relative space between the right and left eyepieces, e.g., 72 mm to 58 mm as can be appreciated from FIG. 3. When the prism shelf members 4 and 6 are properly aligned, appropriate slots 14 and 16 in the respective prism shelf members form a cavity receptacle or housing for a cam actuator to be described subsequently.

Obviously, as known in the optical field, the various optical elements such as the prisms 18 and 19 are appropriately aligned and mounted within each prism shelf member to provide a folded optical path. A leaf spring 21 can fasten the prisms to the prism shelf member.

To retain each of the prism shelf members together, an elongated shaft or rod 20 which can include a neck strap retainer 22 is mounted respectively through an upper focusing assembly cover 24, a hinge locking ring 26, and a pair of cone bearing washers 28 and 30.

Also mounted on the rod 20 from the objective side of the prism shelf member 4 is a pair of spacer washers 32 and 34 and a cam follower member 36. Mounted across a cavity 38 on a side of the cam follower member 36, is a connecting pin 40. Extending from the objective side is a pair of cam followers 42 and 44, to be described subsequently. During assembly, the cam follower member 36 is slid along the rod 20 so that the cavity 38 and connecting pin 40 are mounted in alignment with the slots 14 and 16 on the prism shelf members. The spacer washers 32 and 34 assist in proper alignment and free rotational movement of the cam member 36 about the rod 20.

Journalled within appropriate slots in the respective prism shelf members 4 and 6, are a pair of focusing internal bridge members 46 and 48. Respective alignment ribs 50 and 52 on the internal bridge members are designed to coact with appropriate alignment guides within the prism shelf members to ensure a linear movement to the internal bridge members as they are moved along their respective optical axis. Appropriate negative power lenses 54 and 56 are mounted respectively in the internal bridge members 46 and 48.

The focusing internal bridge member 46 includes a cam portion 58 having a pair of cam surfaces 60 and 62, for coacting with the respective cam followers 42 and 44. The mounting rod 20 extends through a bore 64 between the cam surfaces. The bottom surface of the internal bridge member 46 is undercut to receive a mounting ear 66 of the internal bridge member 48. The relative degree of undercutting insures that the respective focusing lenses 54 and 56 lie on the same parallel plane transverse to the optical axis of the respective right and left optical systems.

A compression spring 68 is mounted on the mounting rod 20 and seats against the rear surface of the mounting ear 66 of the internal bridge mechanism 48. A lower focusing assembly cover nut 70 can be screwed onto the threaded portion 72 of the mounting rod 20. A logo cap 74 can be mounted on the focusing assembly nut 70. A pair of housing shells or objective prism covers 76 and 78 can enclose the focusing mechanism described above and capture the objective half of the prism shelf member 4 and 6 respectively.

A flexible focusing actuator 84 is mounted on the respective planar support surfaces 86 and 88 of the respective prism shelf members 4 and 6. On the upper surface of the actuator 84, a pair of wedge shaped or the like, force members 90 and 92 are provided to assist the viewer in grasping and moving the flexible focusing actuator 84. On the other side of the focusing actuator 84 there is provided a resilient connecting member 94 that is adapted to be fastened onto a connecting pin 96 mounted on a bifurcated lever 98. The actuator 84 has a platelike belt shape.

The bifurcated lever 98 is dimensioned to fit within the cavity formed by the slots 14 and 16 of the prism shelf members. The bifurcated lever 98 is mounted to surround the connecting pin 40 on the cam follower member 36.

A schematic cross-sectional view shown in FIG. 3 discloses the substantially linear translational movement of the focusing actuator 84 relative to the binocular housing and its kinetic effect on the bifurcated lever 98. As a result of this motion, the cam follower member 36 is rotated since it is journalled within the prism shelf members 4 and 6. The cam followers 42 and 44 exert a balanced force on the respective cam surfaces 60 and 62 of the cam bridge 58. This force drives the respective focusing bridge members 46 and 48 in unison against the bias of the compression spring 68. Thus, the respective negative focusing lens 54 and 56 are axially displaced in their respective optical axes.

The focusing actuator 84 can be advantageously molded from plastic to provide a snap fitting resilient connector member 94 for attachment to the connecting pin 96. Likewise, a number of the other components can be molded from plastic.

As can be appreciated from FIG. 3, when the respective housing shells are relatively rotated about connecting rod 20, the flexible focusing actuator 84 is capable of maintaining a tangential position relative to the prism shelf support surfaces 86 and 88. As can be seen on the objective prism cover or housing shell 76, a peripheral lip 100 is adapted to capture a peripheral edge of the focusing actuator 84. A complimentary lip on an ocular prism cover or housing shell 102 will capture the other side of the focusing actuator 84 to retain it between the housing shells and the respective support surfaces. The wedge shaped members 90 and 92 on the focusing actuator 84 extend outward from the binocular housing and add an additional stability to both the focusing actuator and its position relative to the prism covers.

FIG. 2 discloses a bottom partial cross-sectional view of an assembled binocular assembly. The respective right and left ocular prism cover housing shells 102 and 104 can be seen. Referring to the housing shell 102 and a focal ocular lens system 106 is mounted in the housing shell and can be movable along the optical axis for focusing the diopter difference between the eyes. Pliable eye cups 110 and 112 can be mounted about each ocular lens system. A prism 18 or pair of prisms is utilized to fold the optical path and elevate it on a plane with the objective lens system 108. The cam bridge 46 with a negative focusing lens 54 is mounted on the optical axis.

The mounting rod 20 rotatively supports the cam follower member 36 and cam bridges 46 and 48. The compression spring 68 biases the cam bridges forward against the cam follower member 36. Movement of the focusing actuator 84 will displace the negative focusing lens 54 as can be seen on the phantom lines of FIG. 2. This displacement will vary the focal length or focus of the binocular mechanism.

As can be readily seen, the assembling of the binocular mechanism is relatively uncomplicated as a result of the central mounting rod 20 and the design of the associated component parts. The housing shells can rotate to permit relative adjustment of the spacing of the eyepiece or ocular lenses as desired by the viewer. The focusing actuator 84 readily adapts or conforms itself to the relative rotation of the housing members without creating any gaps or openings. The mounting rod 20 not only simplifies the construction assembly but further provides a strap hook 22 that is centrally supported.

While the preferred embodiments have been disclosed in an enabling manner to facilitate the reproduction of the present invention, it should be realized that various modifications can be easily accomplished by a person skilled in this field, and accordingly, the present invention should be measured solely from the following claims.

What is claimed is:

1. A binocular assembly comprising;
a first and second housing member movably mounted relative to each other about a common axis and forming an aperture on the surface;
optical means mounted in the respective first and second housing member for magnifying an object image,
means for focusing the optical means including an actuator body mounted so that at least one of its side surfaces is always adjacent the outside surface of the first and second housing members and movable therewith and a force member operatively connected to and movable by the actuator body for transmitting a displacement force from an operator, the actuator body extends across the aperture and the force member extends through the aperture for providing the displacement force to the optical means for focusing, the actuator body is relatively rigid in any substantially translational movement across the surfaces of the first and second housing members to provide a positive increment of movement through the force member to adjust the focus, the actuator is further relatively flexible during any movement towards and away from the housing member surfaces so that the actuator body can bend to maintain its position adjacent the outside surface of the first and second housing members during any relative rotational movement about their common axis.

2. The invention of claim 1 wherein the actuator body is a platelike member.

3. The invention of claim 1 wherein the means for focusing includes a rotatable cam member operatively connected to the actuator and a focusing lens assembly to transform the actuator's translational displacement into an axial displacement of the focusing lens assembly.

4. The invention of claim 1 wherein the actuator body is a flexible belt.

5. The invention of claim 1 wherein the first and second housing members include a respective prism shelf for supporting the actuator body and a respective pair of ocular and objective prism covers for journalling the actuator body to a limited movement across the prism shelves.

6. The invention of claim 1 further including means for interconnecting the first and second housing members including an elongated connecting member extending through the first and second housing members to permit relative movement.

7. The invention of claim 6 wherein the focusing means is mounted on the elongated connecting member.

8. The invention of claim 7 wherein the elongated connecting member is a rod.

9. The invention of claim 7 wherein the focusing means includes a cam assembly journalled on the elongated connecting member.

10. The invention of claim 9 wherein the first and second housing members includes a pair of prism shelves with a respective male and female coupling journalled on the elongated connecting member.

11. The invention of claim 10 wherein the means for focusing includes the flexible actuator body mounted on the outside of the first and second prism shelves and movable across their outside surfaces.

12. A binocular assembly comprising;
a first and second housing assembly movably mounted relative to each other about a common axis;
optical means in each housing assembly for magnifying an object image;
means for focusing the optical means including a cam assembly, and
means for interconnecting the first and second housing assembly including an elongated connecting member extending through the first and second housing assembly to permit relative movement, the cam assembly journalled on the elongated connecting member.

13. The invention of claim 12 wherein the first and second housing assemblies include a pair of prism shelves with a respective male and female coupling journalled in the elongated connecting member.

14. The invention of claim 13 wherein the means for focusing includes a solid flexible actuator mounted on the outside of the first and second prism shelves and movable across their outside surfaces.

15. In an optical system having an optical axis requiring manual focusing, the improvement comprising;
a housing member;
a focusing lens assembly movably mounted on the optical axis and connected to the housing member;
focusing assembly operatively connected to the focusing lens assembly for imparting axial displacement along the optical axis to the focusing lens assembly, including a manually, operable flexible platelike actuator;
a rotatable cam member operatively connected to the platelike actuator and the focusing lens assembly to transform the actuator's linear displacement into an axial displacement of the focusing lens assembly, and
actuator mounting means for removably mounting the actuator and limiting its movement to substantially a translational displacement across the housing member.

16. The invention of claim 15 wherein the actuator is a rectangular flexible platelike member.

17. The invention of claim 15 wherein the focusing assembly further includes a bifurcated cam follower connected to the actuator and interfacing with the rotatable cam member.

18. The invention of claim 15 further including a fork lever connected to the cam member, the actuator includes a coupling member pivotally mounted to the fork lever.

19. The invention of claim 15 wherein the focusing lens assembly includes a resiliently based lens housing operatively connected to a follower responsive to the cam member.

20. The invention of claim 19 further includes a spring for biasing the lens housing and a mounting shaft axially retaining the cam member, lens housing and spring.

* * * * *